United States Patent [19]

Sano

[11] Patent Number: 5,832,113
[45] Date of Patent: Nov. 3, 1998

[54] DATA INPUT DEVICE WITH A DISPLAY KEYBOARD

[75] Inventor: Teruo Sano, Tachikawa, Japan

[73] Assignee: Casio Computer Co., Ltd., Tokyo, Japan

[21] Appl. No.: 939,859

[22] Filed: Sep. 29, 1997

Related U.S. Application Data

[63] Continuation of Ser. No. 353,926, Dec. 12, 1994.

[30] Foreign Application Priority Data

Dec. 28, 1993 [JP] Japan .................................. 5-349349

[51] Int. Cl.$^6$ .............................. G06K 9/00; G06K 9/62; G06F 15/00
[52] U.S. Cl. ........................... 382/187; 382/188; 395/146
[58] Field of Search ................................... 382/187, 188; 395/146; 345/179

[56] References Cited

U.S. PATENT DOCUMENTS

| 5,063,600 | 11/1991 | Norwood | 345/173 |
|---|---|---|---|
| 5,177,328 | 1/1993 | Ito et al. | 345/173 |
| 5,276,794 | 1/1994 | Lamb, Jr. | 382/189 |
| 5,459,796 | 10/1995 | Boyer | 382/187 |
| 5,481,278 | 1/1996 | Shigematsu et al. | 345/179 |
| 5,502,803 | 3/1996 | Yoshida et al. | 395/146 |

FOREIGN PATENT DOCUMENTS

| 0 603 669 | 6/1994 | European Pat. Off. | G06F 3/033 |
|---|---|---|---|
| WO 92/09944 | 6/1992 | WIPO | G06F 3/033 |

OTHER PUBLICATIONS

George G. Robertson et al, *Buttons as First Class Objects on an X Desktop*, Proceedings of the Symposium on User Interface Software and Technology, Hilton Head, South Carolina, USA Nov. 11, 1991, pp. 35–44.

*Primary Examiner*—Andrew W. Johns
*Assistant Examiner*—Monica S. Davis
*Attorney, Agent, or Firm*—Frishauf, Holtz, Goodman, Langer & Chick

[57] ABSTRACT

A data input device including a display screen on which a keyboard appears, and a tablet that covers the screen. Keys are displayed in such a manner that a single alphabet character appears in a single key representation area. A mark drawn with a pen on the tablet indicates the transformation or modification of the specified character, such that a character indicated by a touch is entered in lowercase, and a character indicated by a check is entered in uppercase. Furthermore, by displaying a plurality of symbols in a single key representation area, one of the symbols can be selected and entered, depending on the manner in which the pen touches the screen.

17 Claims, 8 Drawing Sheets

| KEY DESCRIPTION | PEN OPERATION | | | | |
|---|---|---|---|---|---|
| | | · | ᐯ | ○ | △ |
| | A | a | A | ä | Ä |
| | ] } ⌈ ₒ | ] | } | ₒ | ⌈ |

FIG.7

| KEY DESCRIPTION | PEN OPERATION | | | | | | |
|---|---|---|---|---|---|---|---|
| | | · | ·· | / | \ | ∧ | ○ |
| | E | e | ë | é | è | ê | e̞ |

PRIOR ART

DATA INPUT DEVICE WITH A DISPLAY KEYBOARD

This application is a Continuation of application Ser. No. 08/353,926, filed Dec. 12, 1994.

BACKGROUND OF THE INVENTION

1. Field of the Invention

This invention relates to a data input device, and more particularly to a data input device which facilitates the input of transformed or modified characters.

2. Description of the Related Art

Recently, pen input devices have been attracting attention as input devices for entering data into data processing units. The pen input device is composed of a display unit and a transparent tablet serving as a coordinate input unit, which is placed on top of the display unit. Checking what has appeared on the display unit through the transparent tablet, the user pinpoints a position on the transparent tablet using a pen to enter a data item or a command.

Figure 9:
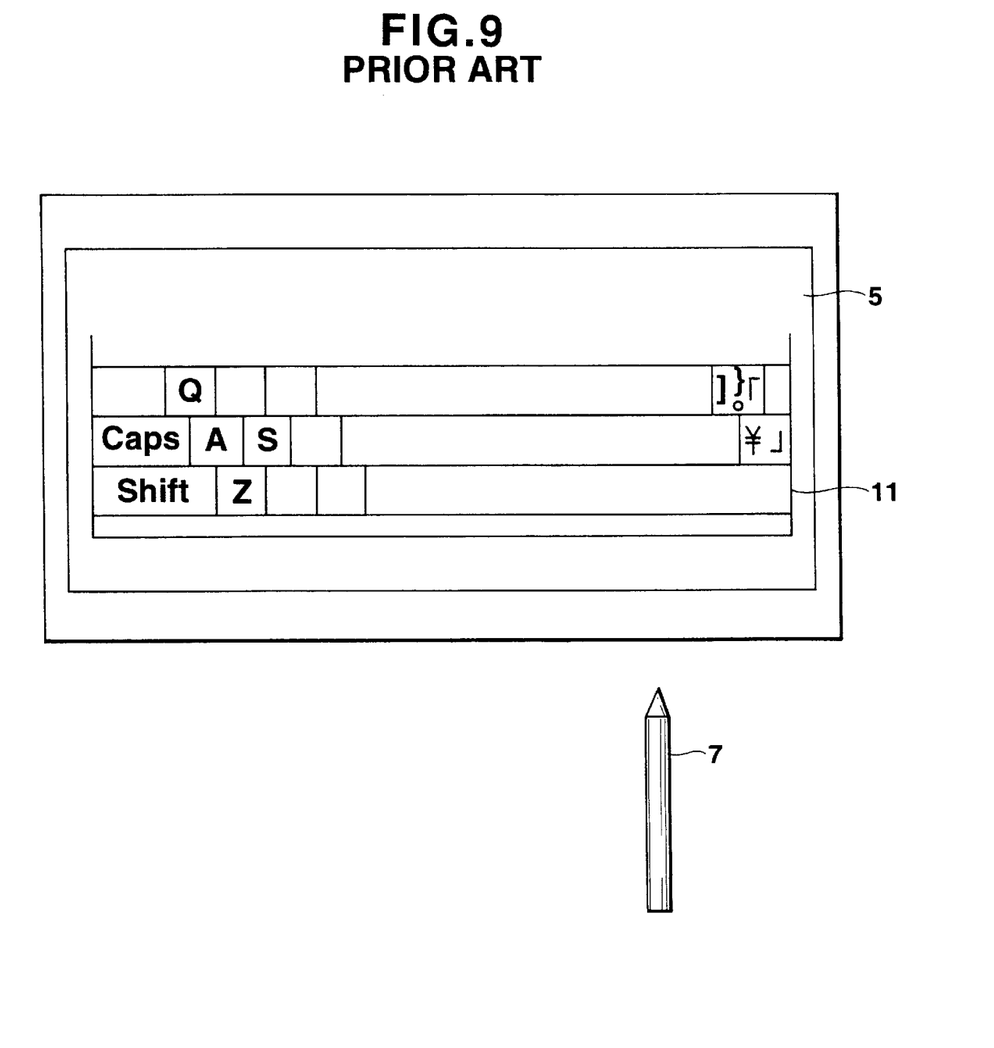
FIG. 9 is a pictorial diagram to help explain the pop-up keyboard on a prior art pen input device.

Some types of pen input devices are such that a pop-up keyboard 11 appears on a display 5 as shown in FIG. 9, and the user is prompted to point out or tap the desired one of the displayed keys with a pen 7, thereby entering the desired character or symbol.

Figure 10A:
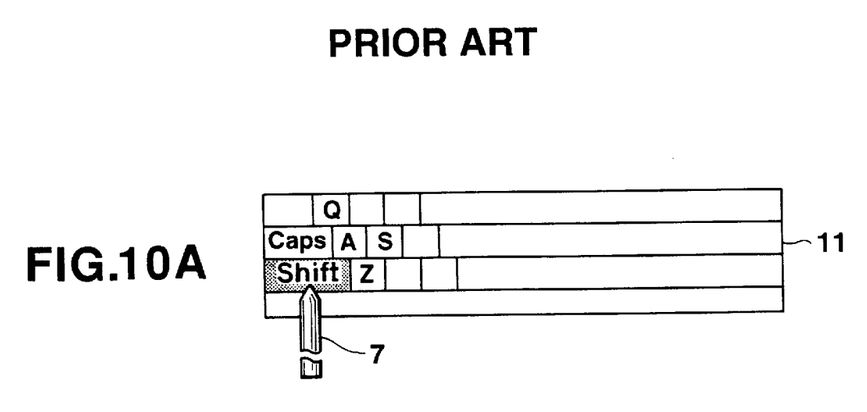
FIGS. 10A and 10B show pen operations in entering a capital letter using the pop-up keyboard shown in FIG. 9.
Figure 10B:
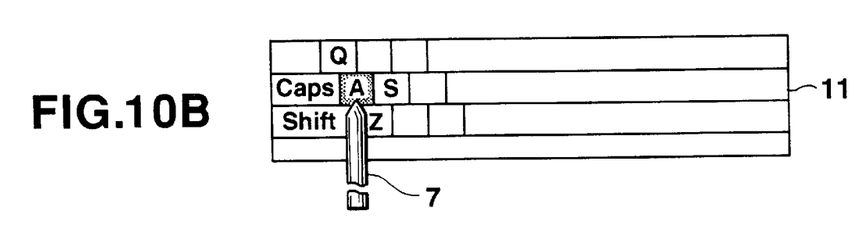

For instance, with the keyboard of FIG. 9, to enter the uppercase or capital letter "A", the "Shift" key is first selected with the pen 7 as shown in FIG. 10A, and then the "A" key is selected with the pen 7 as shown in FIG. 10B. By these operations, the capital letter "A" is entered. A character whose form is changed using the "Shift" key in this way is called a modified character.

As mentioned above, with the pop-up keyboard on a conventional pen input device, since entering a modified character, such as a capital letter or a symbol, involves selecting keys twice, that is, the Shift key and a character key, the input operation is troublesome. The same holds true when "katakana" (one type of Japanese phonetic characters) or English letters are entered in the "hiragana" (another type of Japanese phonetic characters) input mode or when lowercase letters are entered with the "Caps Lock" on. Furthermore, entering specific commands sometimes requires the operation of three keys, for example, a function key, the "Shift" key, and a character key.

SUMMARY OF THE INVENTION

Accordingly, an object of the present invention is to provide a data input device which enables easy input operation.

Another object of the present invention is to provide a pen input device which enables the input of a character with a single pen operation, regardless of the type of character, such as an uppercase character, a lowercase character, or a special symbol.

The first object is accomplished by providing a data input device comprising: a display screen; a pointing device for outputting position data on a point specified on the display screen; a display controller for displaying a keyboard on the display screen; judging means for receiving the position data outputted from the pointing device and determining the shape of the locus drawn by the specified point; and data input means for determining a key data item to be entered, on the basis of the judgment result of the judging means and the output position data.

The second object is accomplished by providing a data input device comprising: means for displaying a keyboard; a tablet provided for selection of a key on the displayed keyboard; means for determining the type of mark drawn by pen operation on the tablet corresponding to a single key representation area; and means for inputting the key data item corresponding to the selected representation key and determined by the drawn mark.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Hereinafter, referring to the accompanying drawings, a data input device according to an embodiment of the present invention will be explained.

Figure 1:
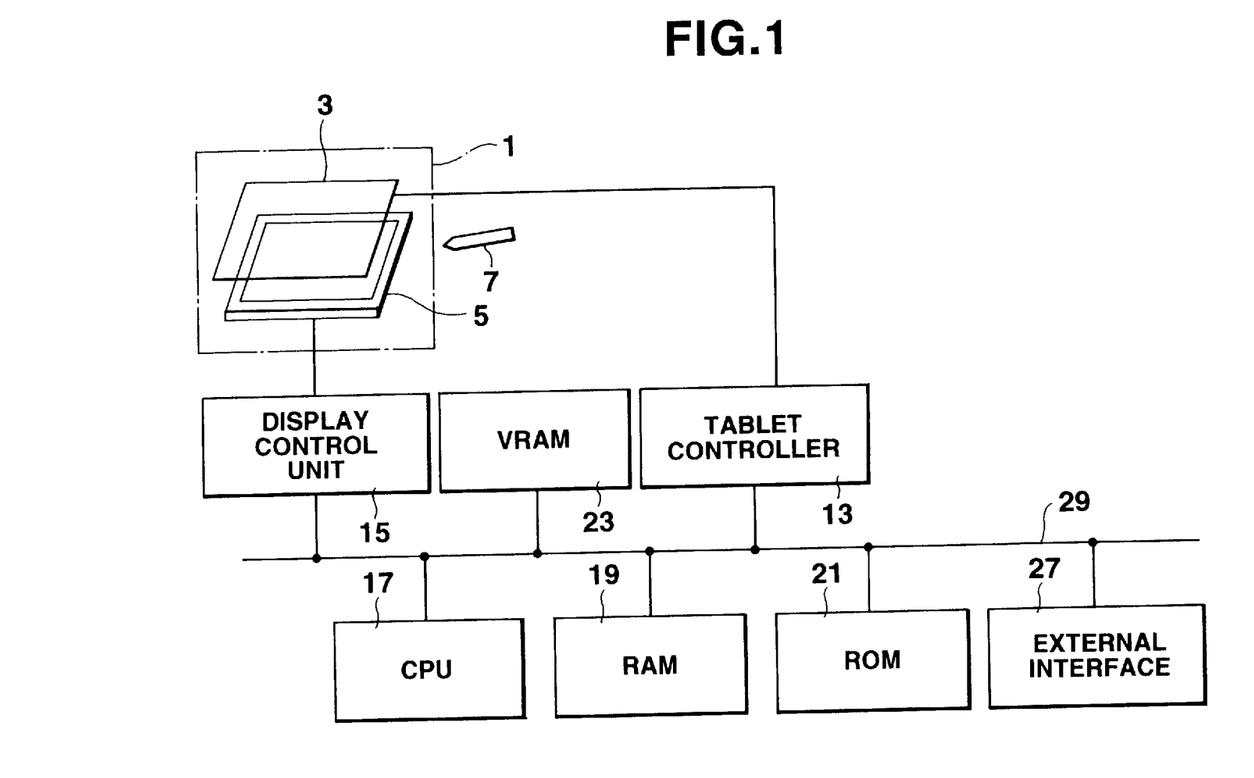
FIG. 1 is a block diagram of a data input device according to an embodiment of the present invention.

FIG. 1 is a block diagram of a data input device of the embodiment.

In FIG. 1, the data input device 1 is composed of a transparent tablet 3 and a display unit 5 made up of, for example, a liquid-crystal display. The transparent tablet 3 is placed on top of the screen of the display unit 5 and senses the position which is pointed at with a pen (stylus) 7. The transparent tablet 3 may be of a well-known type, such as the electromagnetic induction type, the resistive film type, or the capacitive coupling type.

Looking at the representation on the display unit 5 through the transparent tablet 3, the user can indicate a point on the transparent tablet 3 with the pen 7, thereby being able not only to display data but also to enter data on a single coordinate plane.

A CPU 17 controls the entire data input device. A RAM 19 is a memory that can be read from and written into, and stores programs determining the operation of the CPU 17 and various data items. A ROM 21 is a read-only memory, and stores a diagnostic program used after the turning on the power of the data processing unit, a boot program for starting up the data processing unit, and a control program shown in FIG. 3. A VRAM (video RAM) 23 is a bit map memory for storing display data. A display control unit 15 controls the transfer of display data from the VRAM 23 to the display unit 5 or from the CPU 17 to the VRAM 23.

A tablet controller 13 generates the X,Y coordinate data on the position pointed at with the pen 7 and transmits the generated X,Y coordinate data to the CPU 17. An external interface 27 controls the data exchange between the device and an external unit if necessary. These sections are connected to each other via a bus 29.

The pen 7, tablet 3, and tablet controller 13 will be explained with reference to FIG. 2.

The pen 7 contains a switch (touch switch) 73 that turns on and off in connection with the up-and-down movement of the pen point 71 that is brought into or out of contact with the tablet surface, a power supply 75 that supplies power in response to the turning on of the touch switch 73, a high-frequency source 77 that generates a high-frequency signal from the power supplied from the power supply 75, and a transmitter 79 that transmits the signal outputted from the high-frequency source 77.

The tablet 3 is provided with transparent receiving antennas 3X, 3Y extending in the X and the Y direction.

The tablet controller 13 scans the transparent antennas 3X, 3Y, determines the levels of the signals supplied from the transparent antennas 3X, 3Y, judges that the intersection of X-direction antenna 3X and Y-direction antenna 3Y where the highest-level signal has been obtained is the position that has been indicated, and then generates the X,Y coordinate data about the position.

Figure 3:
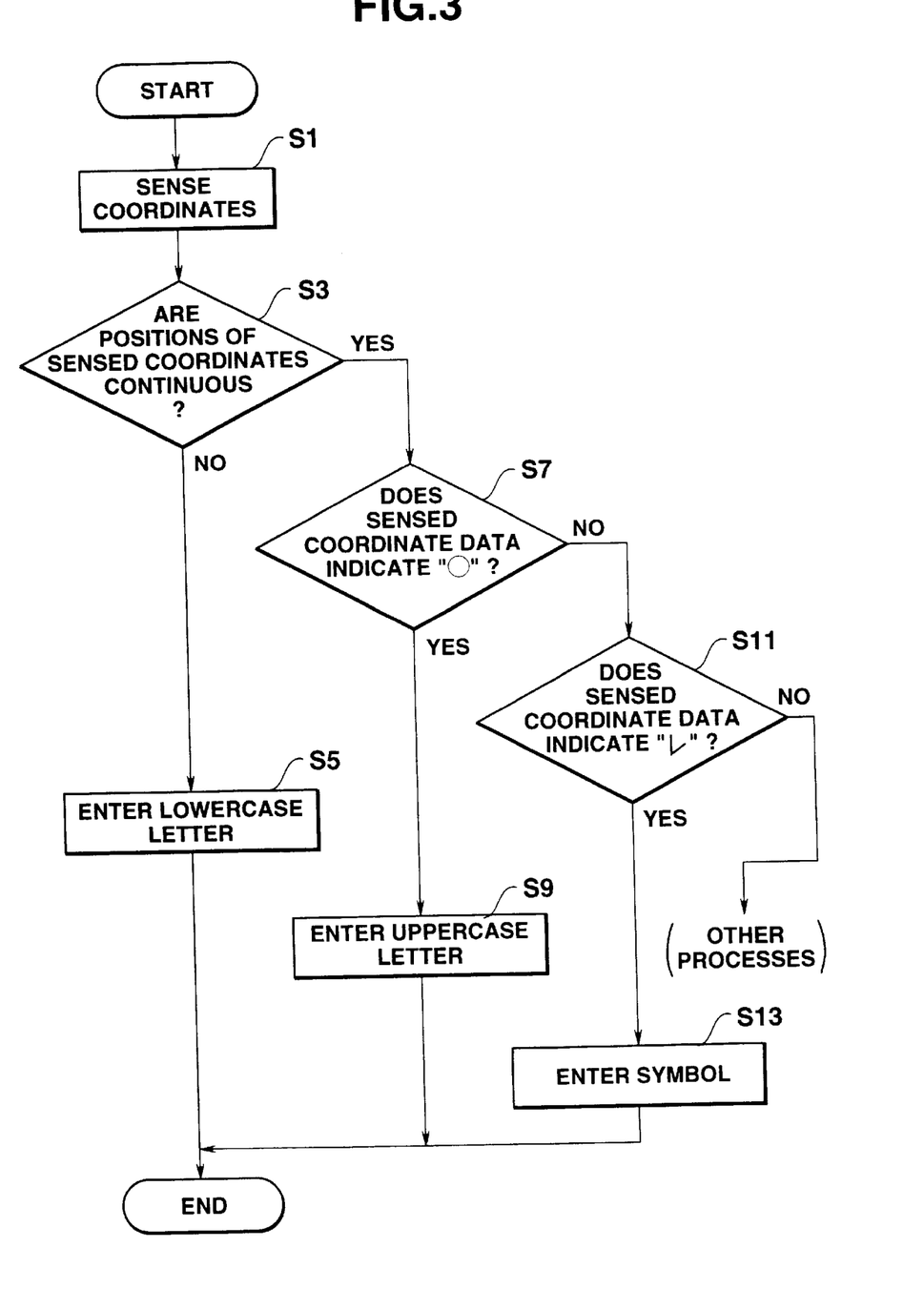
FIG. 3 is a flowchart for the operation of the embodiment in FIG. 1.

The operation of the data input device thus constructed will be described with reference to FIGS. 3 to 5. It is assumed that as shown in FIG. 9, the pop-up keyboard 11 appears on the display unit 5 and the alphabet input mode is set.

(i) Entering lowercase letters

To enter a lowercase letter, the user taps the desired character key with the pen 7 as with a conventional device. Specifically, the user draws a dot "·" on the desired character key. The tablet controller 13 senses the coordinates of the position at which the pen has touched the tablet 3, and supplies them to the CPU 17. The CPU 17 takes in the sensed coordinates at step S1 in the flowchart of FIG. 3, judges which key on the keyboard is specified, and stores the coordinates (positional data) in the RAM sequentially. Then, at step S3, the CPU 17 judges whether or not the positions of the sensed coordinates are continuous. In the case of tap operation, the positions of the sensed coordinates are discontinuous. Thus, the CPU 17 judges that a discontinuous operation has been done, and enters the lowercase letter of the key tapped with the pen 7 at step S5. For instance, when key "A" is tapped, letter "a" is entered.

(ii) Entering uppercase letters

Figure 4:
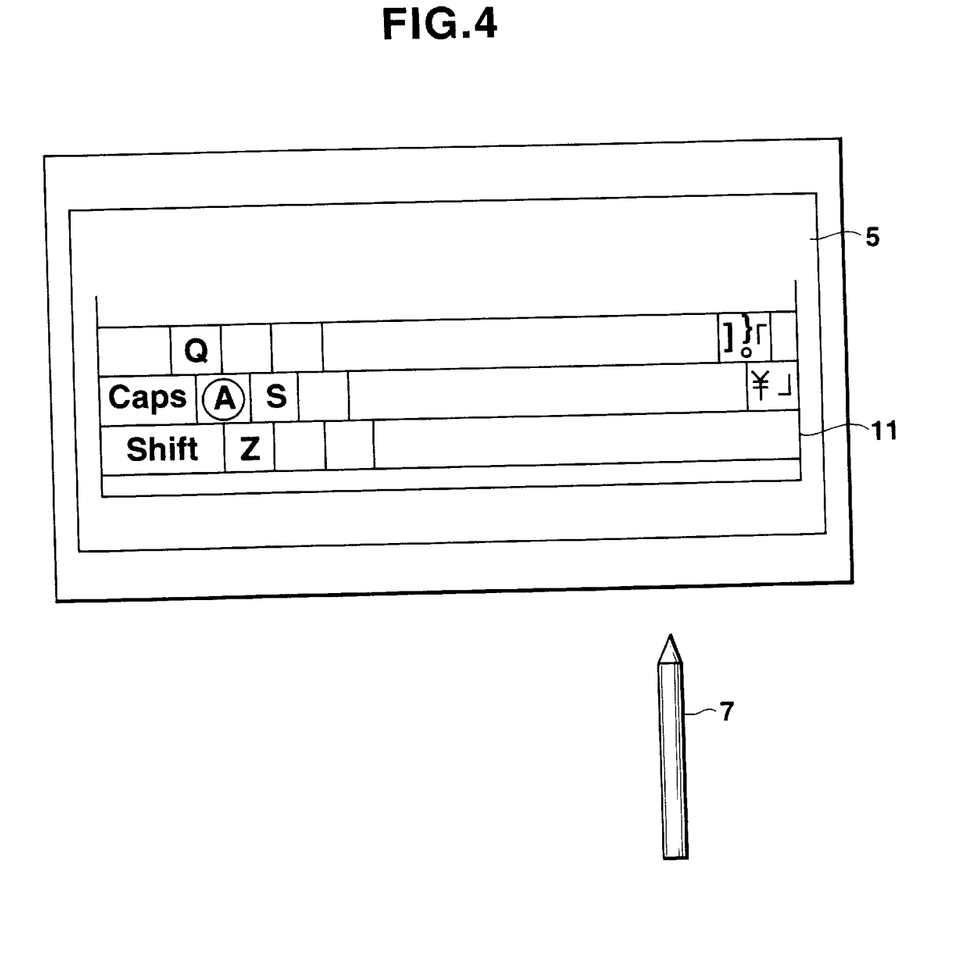
FIG. 4 is a pictorial diagram to help explain the operation of entering a capital letter.

To enter an uppercase letter, the user draws a circle "○" with the pen 7 on the desired key on the pop-up keyboard as shown in FIG. 4. As a result, the CPU 17 judges that the positions of the coordinates sensed at step S3 are continuous, and judges at step S7 whether or not the locus of the pen is circular on the basis of the sensed coordinates. Having judged that it is circular, the CPU 17 enters the uppercase letter of the character allocated to the key on which a circle has been drawn. Thus, in FIG. 4, uppercase letter "A" is entered.

(iii) Entering special symbols

Figure 5:
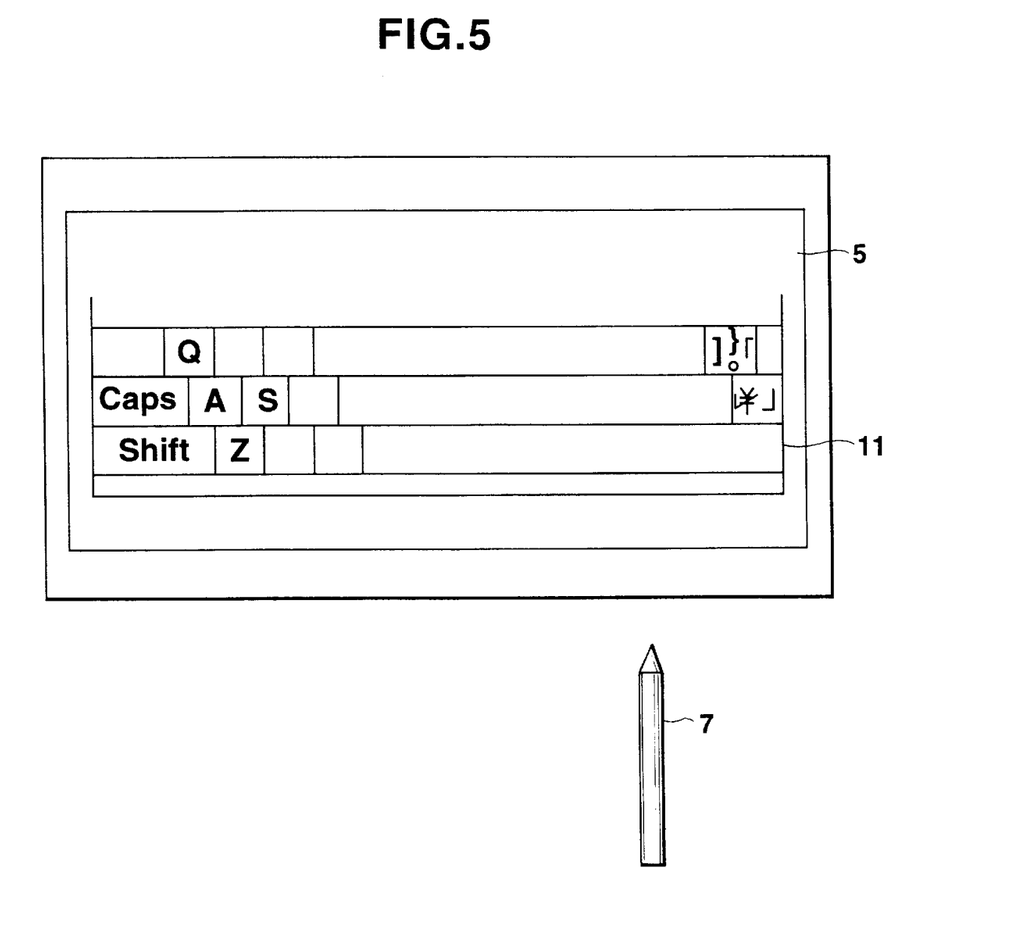
FIG. 5 is a pictorial diagram to help explain the operation of entering a symbol.

To enter a special symbol, the user draws a check "v" on the desired symbol (symbol ¥ in the embodiment) with the pen 7 as shown in FIG. 5. Then, the CPU 17 judges at step S3 that the positions of the sensed coordinates are continuous, and at step S7 that the sensed coordinate data is not about a circle. Next, at step S11, the CPU 17 judges that the sensed coordinate data is about a check, and at step S13, enters symbol "¥" for the key on which a check has been drawn.

As described above, with the embodiment, the user can change the data that he or she wants to enter by drawing specific marks on the desired key on the software keyboard, such as drawing a dot, a circle, or a check. As a result, the user can enter uppercase letters or symbols without operating any modify key such as the "Shift" key, and therefore enter modified characters easily.

The relationship of the type of locus and the entered data in the pen operation is not limited to the above embodiment. Other embodiments will be explained below.

A second embodiment of the present invention will be explained.

Figure 6:
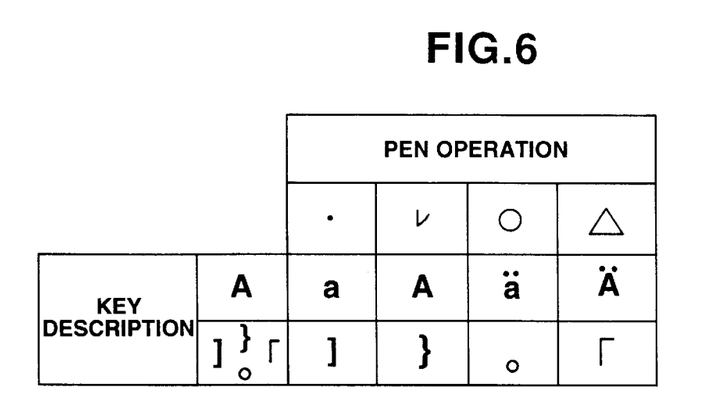
FIG. 6 is an illustration to help explain data input in a second embodiment of the present invention.

As shown in FIG. 6, it is assumed that the movements of the pen include a touch (·), a check (v), a circle (○), a triangle (Δ). The movements determine whether the letter should be lowercase, uppercase, or marked with an umlaut.

For instance, as shown in FIG. 6, when the user touches the key representation "A" in a normal manner, the lowercase letter "a" is entered; when the user checks the same portion, the uppercase letter "A" is entered. When the user draws a circle on the key representation "A", an umlauted lowercase letter "a" is entered; when the user draws a triangle, an umlauted uppercase letter "A" is entered.

Furthermore, a plurality of keys may be allowed to appear in a single key representation area, and a single key is selected from them by performing one of the above four movements.

For instance, characters may be entered by the type of pen operation as shown in FIG. 6, for the four types of keys appearing in the key representation area at the upper right of FIG. 4.

A third embodiment of the present invention will be explained.

With the invention which allows various types of key input, depending on the way of touching the tablet on the display section, or the keyboard appearing on the display section, it is easy to enter various languages.

Figure 7:
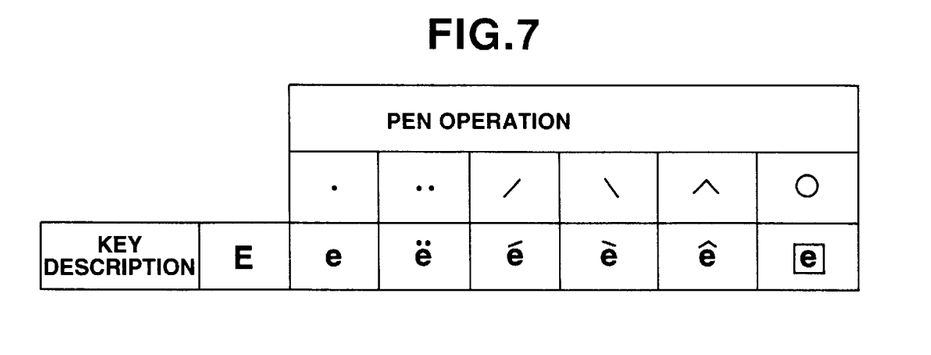
FIG. 7 is an illustration to help explain data input in a third and a fourth embodiment of the present invention.

In FIG. 7, the provided pen movements include a touch (·) a double touch (··), a slash (/), a back slash (\), and an accent circonflexe (^). Drawing one of these mark, the user can enter German characters or French characters.

For instance, touching the key representation "E" twice enables the input of umlauted "e"; drawing a slash mark enables the input of "e" marked with an accent aigu or "é".

With the embodiment, the same operation as drawing a specific mark for character modification enables selection of the desired character, thereby making it easy to use the device.

A fourth embodiment of the present invention will be explained.

While in the above embodiments, key data items (characters) are changed depending on pen movement, the form of a character may be changed in a similar manner.

For example, when the key representation "E" is enclosed by a circle, highlighted or white-black-reversed "e" may be entered (see FIG. 7).

In this case, instead of a highlighted character, a slanted character or a shadowed character may be entered. Additionally, the width or height of a character may be doubled, instead.

Figure 8:
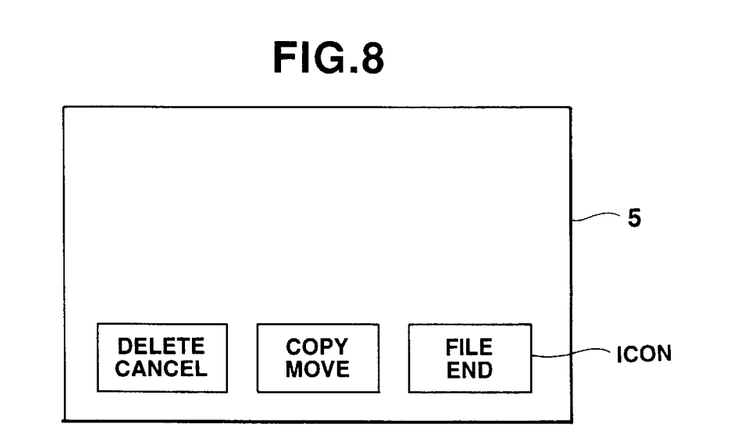
FIG. 8 shows the icons to which more than one command is allocated in a fifth embodiment of the present invention.

While in the above embodiments, the way of selecting a key on the software keyboard has been explained, a plurality of contents (e.g., commands) may be allocated to a single icon, and the desired function be selected by drawing one of different marks as shown in FIG. 8.

Figure 2:
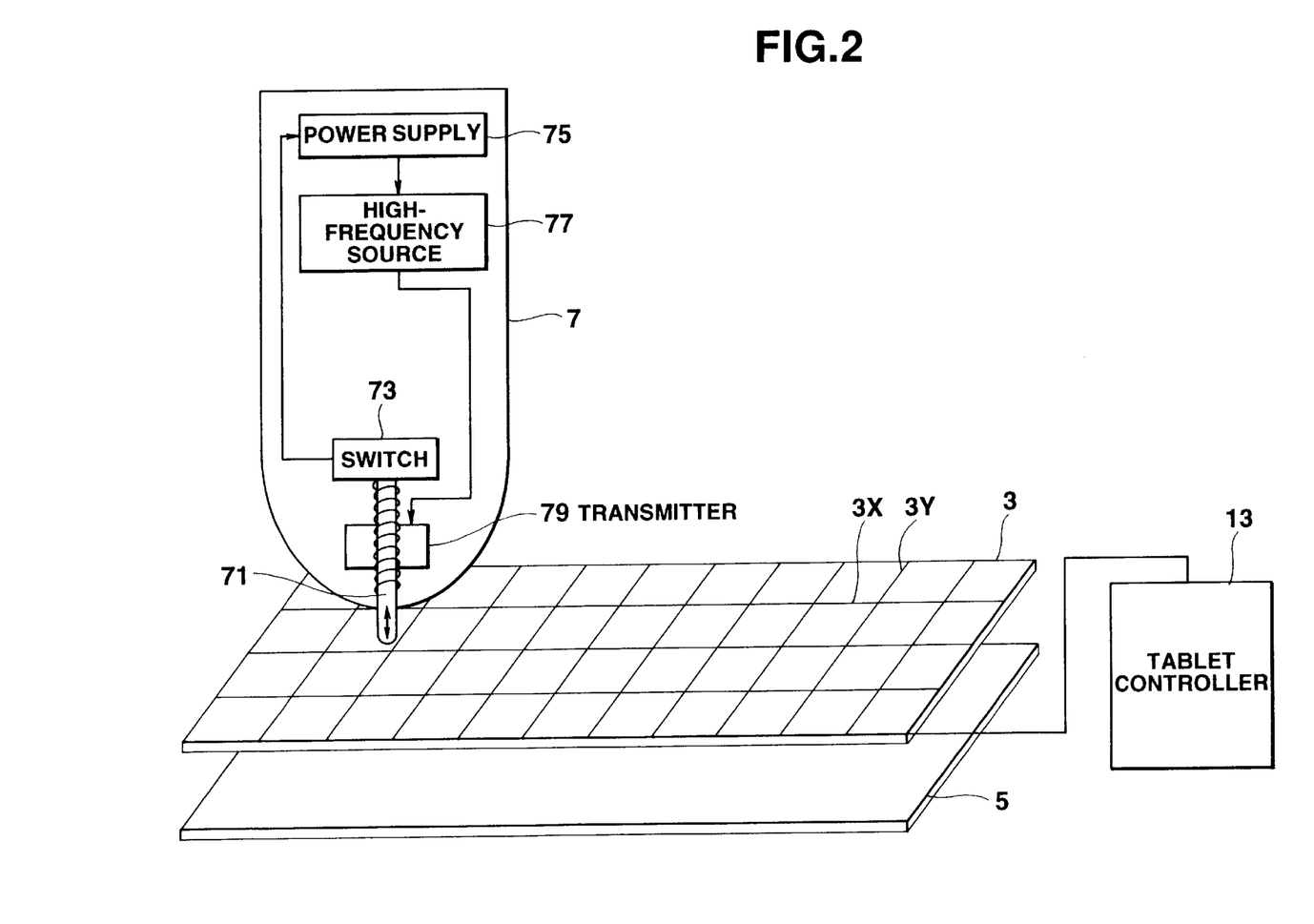
FIG. 2 illustrates the structure of the tablet and pen shown in FIG. 1.

Although in FIG. 2, the tablet 3 and pen 7 are based on electromagnetic waves, the tablet and pen may be of any suitable type, for example, the electrostatic coupling type, or the resistive film type.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A character input device comprising:

a display screen;

a display controller for displaying a keyboard on said display screen, the keyboard including keys each of which is assigned a plurality of characters;

a pointing device for designating one of said keys on said display screen;

determining means for determining a motion of said pointing device on said designated key; and input means for entering one character from the plurality of characters assigned to said designated key in accordance with the motion of the pointing device determined by said determining means with respect to the designated key.

2. The data input device according to claim 1, wherein:

said display controller includes means for displaying an alphabet character in a single key representation area on the keyboard; and said input means includes means for determining whether an alphabet character corresponding to the key designated by said pointing device is a lowercase or uppercase character, based on the motion of the pointing device determined by said determining means.

3. The data input device according to claim 1, wherein:

said display controller includes means for displaying an alphabet character in a single key representation area on the keyboard; and said input means includes means for determining an accent/pronunciation mark to be attached to an alphabet character corresponding to the key designated by said pointing device.

4. The data input device according to claim 1, wherein:

said display controller includes means for displaying an alphabet character in a single key representation area on the keyboard; and said input means includes means for determining a font type of an alphabet character corresponding to the key designated by said pointing device.

5. The data input device according to claim 1, wherein:

said display controller includes means for displaying a plurality of symbol marks in a single key representation area on the keyboard; and said input data determination means includes means for selecting one of the plurality of symbol marks on the basis of the motion of the pointing device determined by said determining means.

6. A data input device according to claim 1, wherein said determining means includes means for detecting a shape of a locus of a motion of the pointing device.

7. A data input device comprising:

display means for displaying a keyboard having a plurality of keys each of which is assigned a plurality of characters corresponding to predetermined pen operations respectively;

a tablet provided for selection of one of said keys of the keyboard displayed on said display means;

a pen for selecting one of said keys with said tablet;

detecting means for detecting a type of pen operation by said pen on a single key representation area of said tablet corresponding to said selected key; and determination means for determining one of said plurality of characters corresponding to the type of pen operation detected by said detecting means with respect to the single key representation area of said selected key.

8. The data input device according to claim 7, wherein said keyboard display means includes means for displaying an alphabet character in said single key representation area.

9. The data input device according to claim 8, wherein said determination means includes means for determining a change with respect to a form of the alphabet character determined as input key data in accordance with the type of mark detected by said detecting means.

10. The data input device according to claim 9, wherein said change with respect to the form of the alphabet character includes at least one of a change from an uppercase to a lowercase character and vice versa, a change into a modified character, and a change in font of a character.

11. The data input device according to claim 7, wherein:

said keyboard display means includes means for displaying a plurality of symbol marks in said single key representation area; and said determination means includes means for selecting one of the plurality of symbol marks according to the drawn mark detected by said detecting means.

12. A method of determining input data, comprising the steps of:

a) displaying a keyboard on a screen;

b) assigning a plurality of characters to keys of said keyboard, respectively;

c) associating marks made by motion of a pen with said plurality of characters, respectively;

d) drawing a mark with a pen on a selected key on the keyboard displayed on the screen;

e) detecting a motion of the pen to detect a drawn mark; and f) determining one of said characters for said selected key on the basis of the detected drawn mark.

13. The method according to claim 12, wherein:

the displaying step a) includes the step of displaying an alphabet character in a single key representation area on the keyboard; and the determining step f) includes the step of determining whether the determined key data comprises a lowercase or uppercase alphabet character.

14. The method according to claim 12, wherein:

the displaying step a) includes the step of displaying an alphabet character in a single key representation area on the keyboard; and the determining step f) includes the step of determining an accent/pronunciation mark to be attached to an alphabet character determined as the key data.

15. The method according to claim 12, wherein:

the displaying step a) includes the step of displaying an alphabet character in a single key representation area on the keyboard; and the determining step f) includes the step of determining a font of an alphabet character determined as the key data.

16. The method according to claim 12, wherein:

the displaying step a) includes the step of displaying a plurality of marks in a single key representation area on the keyboard; and the determining step f) includes the step of selecting one of the plurality of marks on the basis of the determined key data.

17. A method of determining input data, comprising the steps of:

displaying a keyboard on a display screen;

assigning a plurality of characters to keys of said keyboard, respectively;

designating with a pointing device one of said keys which is displayed on said display screen;

determining a motion of said pointing device with respect to said designated key; and entering one character from the plurality of characters assigned to said designated key in accordance with the motion of the pointing device as determined by said determining step with respect to the designated key.

* * * * *